US011710978B2

(12) United States Patent
Kacperski et al.

(10) Patent No.: US 11,710,978 B2
(45) Date of Patent: **\*Jul. 25, 2023**

(54) BATTERY CHARGER AND METHOD FOR CHARGING A BATTERY

(71) Applicant: Magnetic Energy Charging, Inc, Ardmore, PA (US)

(72) Inventors: Alan Kacperski, Willoughby, OH (US); Geoffrey S. Miller, Haverford, PA (US)

(73) Assignee: MAGNETIC ENERGY CHARGING, INC., Ardmore, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,850

(22) Filed: May 20, 2022

(65) Prior Publication Data

US 2022/0278543 A1 Sep. 1, 2022

Related U.S. Application Data

(63) Continuation of application No. 17/348,200, filed on Jun. 15, 2021, now Pat. No. 11,342,776.

(Continued)

(51) Int. Cl.
*H02J 7/00* (2006.01)

(52) U.S. Cl.
CPC ...... *H02J 7/007182* (2020.01); *H02J 7/0029* (2013.01); *H02J 7/0045* (2013.01);
(Continued)

(58) Field of Classification Search
CPC .. H02J 7/007182; H02J 7/0029; H02J 7/0045; H02J 7/0071; H02J 7/00711; H02J 7/00714
(Continued)

(56) References Cited

U.S. PATENT DOCUMENTS 3,963,976 A 6/1976 Clark
4,236,107 A 11/1980 Templin
(Continued)

FOREIGN PATENT DOCUMENTS

CN 104334393 A 2/2015
CN 108011425 A 5/2018
(Continued)

OTHER PUBLICATIONS

Sebastian et al., "Adaptive fast charging methodology for commercial Li-ion batteries based on the internal resistance spectrum" Wiley, 1(20), 16 pages, Feb. 2020.
(Continued)

*Primary Examiner* — John T. Trischler
(74) *Attorney, Agent, or Firm* — Panitch Schwarze Belisario & Nadel LLP (57) ABSTRACT

A charger for impulsed charging of a battery includes first and second charging contacts configured to receive a battery to be charged, a DC power input having first and second terminals, and an inductor having first and second ends. The first end is selectively conductively connectable to the first terminal and the second charging contact. The second end is selectively conductively connectable to the first charging contact and the second terminal. A switch is between the second end and the second terminal such that with the switch in a first configuration, the inductor is connected across the DC power input to enable magnetic energization of the inductor, and in a second configuration, the inductor is disconnected from the DC power input and connected across the charging contacts to enable magnetic energy in the inductor to discharge to the battery. The switch is alternated between configurations during charging of the battery.

7 Claims, 9 Drawing Sheets

Related U.S. Application Data (60) Provisional application No. 63/039,119, filed on Jun. 15, 2020.

(52) U.S. Cl.
CPC ......... *H02J 7/0071* (2020.01); *H02J 7/00711* (2020.01); *H02J 7/00714* (2020.01); *H02J 7/0049* (2020.01); *H02J 2207/20* (2020.01)

(58) Field of Classification Search
USPC .................................................. 320/139
See application file for complete search history.

(56) References Cited

U.S. PATENT DOCUMENTS

| | | | |
|---|---|---|---|
| 5,250,891 A | 10/1993 | Glasgow | |
| 5,479,083 A | 12/1995 | Brainard | |
| 5,631,534 A | 5/1997 | Lewis | |
| 5,821,729 A | 10/1998 | Schmidt et al. | |
| 5,912,545 A * | 6/1999 | Monet | H02J 7/02 |
| | | | 320/114 |
| 5,932,994 A * | 8/1999 | Jo | G05F 1/67 |
| | | | 323/299 |
| 6,064,329 A | 5/2000 | Byrd et al. | |
| 6,140,800 A | 10/2000 | Peterson | |
| 6,202,615 B1 | 3/2001 | Pels et al. | |
| 6,255,804 B1 * | 7/2001 | Herniter | H02J 7/35 |
| | | | 320/137 |
| 6,259,229 B1 | 7/2001 | Ashtiani et al. | |
| 6,545,444 B2 | 4/2003 | Bedini | |
| 7,599,196 B2 * | 10/2009 | Alexander | H02M 5/297 |
| | | | 363/124 |
| 7,615,966 B2 | 11/2009 | Houldsworth et al. | |
| 7,701,173 B2 * | 4/2010 | Veselic | H02J 7/00 |
| | | | 320/112 |
| 7,759,900 B2 * | 7/2010 | Samstad | H02M 3/1582 |
| | | | 320/141 |
| 7,778,045 B2 * | 8/2010 | Alexander | H02M 7/4807 |
| | | | 363/124 |
| 7,834,587 B1 * | 11/2010 | Samstad | H02J 9/04 |
| | | | 320/141 |
| 7,834,592 B2 | 11/2010 | Smith et al. | |
| 7,868,483 B2 | 1/2011 | Lu et al. | |
| 7,893,655 B2 * | 2/2011 | Veselic | H02J 7/00 |
| | | | 320/112 |
| 7,965,058 B2 * | 6/2011 | Veselic | H02J 7/00 |
| | | | 320/112 |
| 7,990,110 B2 | 8/2011 | Bedini | |
| 8,004,240 B2 * | 8/2011 | Samstad | H02J 7/00 |
| | | | 320/141 |
| 8,129,945 B2 | 3/2012 | Hartzog | |
| 8,228,032 B2 | 7/2012 | Bai et al. | |
| 8,269,465 B2 | 9/2012 | Smith et al. | |
| 8,269,466 B2 | 9/2012 | Smith et al. | |
| 8,300,426 B2 * | 10/2012 | Alexander | H02M 5/225 |
| | | | 363/124 |
| 8,345,452 B2 * | 1/2013 | Alexander | H02M 5/293 |
| | | | 363/124 |
| 8,395,910 B2 * | 3/2013 | Alexander | H02M 7/4807 |
| | | | 363/142 |
| 8,400,800 B2 * | 3/2013 | Alexander | H02M 5/297 |
| | | | 363/142 |
| 8,466,657 B2 * | 6/2013 | Buono | H02J 7/0019 |
| | | | 320/120 |
| 8,692,515 B2 | 4/2014 | Nakao et al. | |
| 8,692,516 B2 | 4/2014 | Nork et al. | |
| 8,779,716 B2 | 7/2014 | Fotherby | |
| 9,059,588 B2 | 6/2015 | Nakao | |
| 9,083,188 B2 | 7/2015 | Nakao | |
| 9,130,461 B2 * | 9/2015 | Alexander | H02M 5/297 |
| 9,148,028 B2 | 9/2015 | Suzuki et al. | |
| 9,166,416 B2 | 10/2015 | Gerlovin | |
| 9,172,257 B2 | 10/2015 | Touzani et al. | |
| 9,178,367 B2 | 11/2015 | Nakao | |
| 9,270,132 B2 | 2/2016 | Yun et al. | |
| 9,385,553 B2 | 7/2016 | Aiura | |
| 9,490,644 B2 * | 11/2016 | Chang | H02J 7/00 |
| 9,595,836 B2 | 3/2017 | Wang et al. | |
| 9,764,654 B2 | 9/2017 | Malrieu | |
| 9,793,725 B2 | 10/2017 | Sung et al. | |
| 9,831,690 B2 | 11/2017 | Butzmann | |
| 9,847,655 B2 | 12/2017 | Bailly et al. | |
| 9,899,932 B2 * | 2/2018 | Alexander | H02M 5/225 |
| 10,119,514 B2 | 11/2018 | Averbukh et al. | |
| 10,180,460 B1 | 1/2019 | Castelaz | |
| 10,312,553 B2 | 6/2019 | Kubota | |
| 10,396,662 B2 | 8/2019 | Lubomirsky | |
| 10,523,042 B2 * | 12/2019 | Song | H02J 7/02 |
| 10,559,963 B2 | 2/2020 | Nakao | |
| 10,581,121 B2 | 3/2020 | Nakao et al. | |
| 10,700,536 B2 | 6/2020 | Kubota | |
| 10,862,318 B2 | 12/2020 | Stuart | |
| 11,027,614 B2 | 6/2021 | Nakao | |
| 11,342,776 B2 * | 5/2022 | Kacperski | H02J 7/0029 |
| 2002/0130633 A1 | 9/2002 | Bedini | |
| 2003/0127928 A1 | 2/2003 | Bedini | |
| 2004/0012347 A1 | 1/2004 | Ribarich | |
| 2004/0095266 A1 | 5/2004 | Kemahan et al. | |
| 2005/0077878 A1 | 4/2005 | Carrier et al. | |
| 2006/0220621 A1 | 10/2006 | Huber et al. | |
| 2007/0132427 A1 * | 6/2007 | Veselic | H02J 7/00 |
| | | | 320/111 |
| 2007/0222297 A1 | 9/2007 | Hung | |
| 2008/0013351 A1 * | 1/2008 | Alexander | H02M 5/225 |
| | | | 363/123 |
| 2008/0031019 A1 * | 2/2008 | Alexander | H02M 5/293 |
| | | | 363/37 |
| 2008/0129250 A1 | 6/2008 | Bedini | |
| 2009/0085524 A1 | 4/2009 | Smith et al. | |
| 2009/0085525 A1 | 4/2009 | Smith et al. | |
| 2009/0085526 A1 | 4/2009 | Smith et al. | |
| 2009/0167247 A1 | 7/2009 | Bai et al. | |
| 2009/0251106 A1 * | 10/2009 | Samstad | H02J 7/00 |
| | | | 320/141 |
| 2009/0278496 A1 | 11/2009 | Nakao et al. | |
| 2010/0067272 A1 * | 3/2010 | Alexander | H02M 7/797 |
| | | | 363/123 |
| 2010/0156179 A1 * | 6/2010 | Veselic | H02J 7/00 |
| | | | 307/35 |
| 2010/0270977 A1 * | 10/2010 | Samstad | H02J 9/04 |
| | | | 320/137 |
| 2011/0099802 A1 | 5/2011 | Veselic | |
| 2011/0109271 A1 | 5/2011 | Samstad | |
| 2012/0008353 A1 * | 1/2012 | Alexander | H02M 7/4807 |
| | | | 363/123 |
| 2012/0020129 A1 * | 1/2012 | Alexander | H02M 7/4807 |
| | | | 363/123 |
| 2012/0033464 A1 * | 2/2012 | Alexander | H02M 5/297 |
| | | | 363/37 |
| 2012/0051100 A1 * | 3/2012 | Alexander | H02M 5/225 |
| | | | 363/37 |
| 2012/0126755 A1 | 5/2012 | Perisic et al. | |
| 2012/0187897 A1 | 7/2012 | Lenk et al. | |
| 2013/0057198 A1 | 3/2013 | Gerlovin | |
| 2013/0076309 A1 | 3/2013 | Nork et al. | |
| 2013/0113432 A1 | 5/2013 | Suzuki et al. | |
| 2013/0187612 A1 | 7/2013 | Aiura | |
| 2013/0249476 A1 | 9/2013 | Touzani et al. | |
| 2013/0342156 A1 | 12/2013 | Nakao | |
| 2014/0009106 A1 | 1/2014 | Andrea | |
| 2014/0009116 A1 | 1/2014 | Nakao | |
| 2014/0015475 A1 | 1/2014 | Nakao | |
| 2014/0084868 A1 | 3/2014 | Yun et al. | |
| 2014/0133203 A1 | 5/2014 | Alexander | |
| 2014/0217980 A1 | 8/2014 | Malrieu | |
| 2015/0002083 A1 | 1/2015 | Nakao | |
| 2015/0002084 A1 | 1/2015 | Nakao | |
| 2015/0069956 A1 | 3/2015 | Hu et al. | |
| 2015/0069957 A1 * | 3/2015 | Chang | H02J 7/007 |
| | | | 320/107 |

(56) References Cited

U.S. PATENT DOCUMENTS

| | | | |
|---|---|---|---|
| 2015/0069958 A1* | 3/2015 | Yang | H02J 7/00 320/137 |
| 2015/0222137 A1 | 8/2015 | Wang et al. | |
| 2015/0236533 A1 | 8/2015 | Yamamoto et al. | |
| 2015/0256020 A1 | 9/2015 | Fakai | |
| 2015/0357842 A1 | 12/2015 | Bailly et al. | |
| 2016/0072400 A1* | 3/2016 | Alexander | H02M 5/293 363/35 |
| 2016/0164314 A1 | 6/2016 | Wang et al. | |
| 2017/0084959 A1 | 3/2017 | Nakao et al. | |
| 2018/0090945 A1 | 3/2018 | Langlinais et al. | |
| 2018/0159432 A1 | 6/2018 | Lai et al. | |
| 2018/0233787 A1 | 8/2018 | Kubota | |
| 2018/0309311 A1 | 10/2018 | Schaef et al. | |
| 2018/0331564 A1* | 11/2018 | Song | H02J 7/02 |
| 2019/0039476 A1 | 2/2019 | Nakao | |
| 2019/0089179 A1 | 3/2019 | Kamibayashi | |
| 2019/0103749 A1 | 4/2019 | Kubota | |
| 2019/0115768 A1 | 4/2019 | Taylor, Jr. et al. | |
| 2019/0222034 A1 | 7/2019 | Stuart | |
| 2020/0195036 A1 | 6/2020 | Jung et al. | |
| 2020/0298722 A1 | 9/2020 | Smolenaers | |
| 2021/0376618 A1 | 12/2021 | Chen et al. | |
| 2021/0391743 A1* | 12/2021 | Kacperski | H02J 7/0071 |

FOREIGN PATENT DOCUMENTS

| | | |
|---|---|---|
| CN | 108123508 A | 6/2018 |
| CN | 108365651 A | 8/2018 |
| CN | 110247456 A | 9/2019 |
| WO | 2012132414 A1 | 10/2012 |
| WO | 2013065364 A1 | 5/2013 |
| WO | 2014115713 A1 | 7/2014 |

OTHER PUBLICATIONS

Witte, "The Automobile Storage Battery Its Care and Repair", Chapters 4-7 and 10, 1922.
Int'l Preliminary Report on Patentability dated Dec. 29, 2022 in Int'l Application No. PCT/US2021/037467.
Int'l Search Report and Written Opinion dated Sep. 21, 2021 in Int'l Application No. PCT/US2021/037467.

* cited by examiner

BATTERY CHARGER AND METHOD FOR CHARGING A BATTERY

CROSS-REFERENCE TO RELATED APPLICATIONS

This application is a continuation application of U.S. patent application Ser. No. 17/348,200, filed Jun. 15, 2021, entitled "Battery Charger and Method for Charging a Battery," currently pending, which claims priority to U.S. Provisional Patent Application No. 63/039,119, filed Jun. 15, 2020, and entitled, "Battery Charger and Method for Charging a Battery,", the entire contents of all of which are incorporated by reference herein.

BACKGROUND

Embodiments described herein relate generally to a battery charger, and more particularly, to a battery charger that charges a battery faster while reducing heat generation during charging, thereby significantly extending battery life and efficiency and restoring a battery cell's chemical composition toward its original condition.

Conventional battery chargers typically connect a direct current (DC) power source through a switch or regulator directly to the battery being charged. Current flows from the DC power source to the battery until a control circuit determines that the battery has reached a desired voltage, at which point the switch is opened. The switch or regulator can be set to a constant current, constant voltage, or a combination of the two during a charging cycle. Other chargers operate in a "pulse" charge mode, meaning that the switch or regulator opens periodically during the charge cycle, but the concept is similar—current flows directly from the DC power source to the battery.

These charging processes will often take several hours or more to restore a drained battery to a full charge. In addition, the recharging process itself generates heat, which can be destructive to the battery. For example, burning of various mechanical components of the battery can inhibit the necessary chemical reactions allowing re-charging operations. Other factors can reduce battery life as well, such as lead sulfation in lead acid batteries or lithium plating on lithium-ion batteries, for example. These phenomena involve a build-up of material on one of the electrodes during use or charging. Over many charging cycles, the maximum capacity of the battery will decrease, and the time to discharge will also decrease, rendering the battery less effective. This effect can be exacerbated with faster charging methods, which typically increase the applied current as a way to charge the battery in less time. However, higher currents tend to result in higher heat generation, thereby increasing the damage to the battery and reducing its efficiency and life.

It is desired to provide a battery charger that can provide a charge to a battery in a shorter amount of time, and which can also extend the life of the battery by reducing heat generation during the charging process. It is further desired to provide a battery charger that can restore a battery cell's chemical composition toward its original condition.

BRIEF SUMMARY

Briefly stated, one embodiment comprises a charger for impulsed charging of a battery. The charger includes first and second charging contacts each configured to receive a respective terminal of the battery to be charged, a direct current (DC) power input having a first terminal and a second terminal, and an inductor having a first end and a second end. The first end is selectively conductively connectable to the first terminal of the DC power input and to the second charging contact. The second end is selectively conductively connectable to the first charging contact and to the second terminal of the DC power input. A switch is located between the second end of the inductor and the second terminal of the DC power input such that when the switch is in a first configuration, the inductor is connected across the DC power input to enable the DC power input to magnetically energize the inductor, and when the switch is in a second configuration, the inductor is disconnected from the DC power input and is connected across the first and second charging contacts to enable magnetic energy stored in the inductor to discharge to the battery connected across the first and second charging contacts. The switch is configured to be alternated between the first and second configurations during charging of the battery.

In one aspect, the charger further includes a controller configured to control alternation of the switch between the first and second configurations. In another aspect, the charger further includes a current sensor configured to measure the current flowing between the DC power input and the inductor, wherein the controller is configured to move the switch to the second configuration when the measured current exceeds a predetermined threshold value. In another aspect, the controller includes a timer, and the controller is further configured to move the switch to the first configuration upon expiration of the timer. In still another aspect, the charger further includes a voltage sensor connected across the first and second charging contacts and configured to measure a voltage of the battery connected across the first and second charging contacts, wherein the controller is configured to shut off the charger when the measured voltage exceeds a predetermined value.

In another aspect, the charger further includes a diode having an anode and a cathode. The cathode is connected to the first charging contact and the anode is connected to the second end of the inductor such that current flow from the DC power input to the first and second charging contacts is prevented when the switch is in the first configuration.

In another aspect, the inductor is a toroidal type inductor.

In another aspect, when the switch is moved to the second configuration, a current between the inductor and the battery connected across the first and second charging contacts rises from 0 Amperes to a maximum value at a first average rate and declines from the maximum value to 0 Amperes at a second average rate that is lower than the first average rate.

Another embodiment comprises a control circuit for a battery charger that include a direct current (DC) power input, an inductor, a switch, and first and second charging contacts each configured to receive a respective terminal of the battery to be charged. The control circuit is configured to: (a) place the switch into a first configuration such that the inductor is charged by the DC power input while isolated from the battery connected between the first and second charging contacts, (b) determine whether a measured current between the inductor and the DC power input exceeds a predetermined threshold, (c) when the measured current exceeds the predetermined threshold, place the switch into a second configuration such that the inductor discharges to the battery connected between the first and second charging contacts while isolated from the DC power input, (d) determine whether a trigger event has occurred, and (e) after the trigger event has occurred, return to step (a).

In one aspect, the controller includes a timer, and the trigger event is expiration of the timer. In another aspect, the timer is set to at least a known period of time required for the inductor to discharge to 0 Amperes.

In another aspect, the control circuit is further configured to monitor a measured voltage level of the battery connected across the first and second charging terminals during charging of the battery. In another aspect, the control circuit is further configured to shut off the battery charger when the measured voltage level indicates that the battery has a full charge.

Yet another embodiment comprises a method of charging a battery connected to a charging circuit. The charging circuit includes a direct current (DC) power input and an inductor. The method includes: (a) charging the inductor using the DC power input, with the inductor and the DC power input being isolated from the battery during the charging, (b) after charging the inductor, discharging the inductor to the battery, with the inductor and the battery being isolated from the DC power input during the discharging, and (c) repeating steps (a) and (b) sequentially until the battery is charged or is disconnected from the charging circuit.

In one aspect, steps (a) and (b) are repeated at a rate of between 1 and 1,000,000 times per second.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
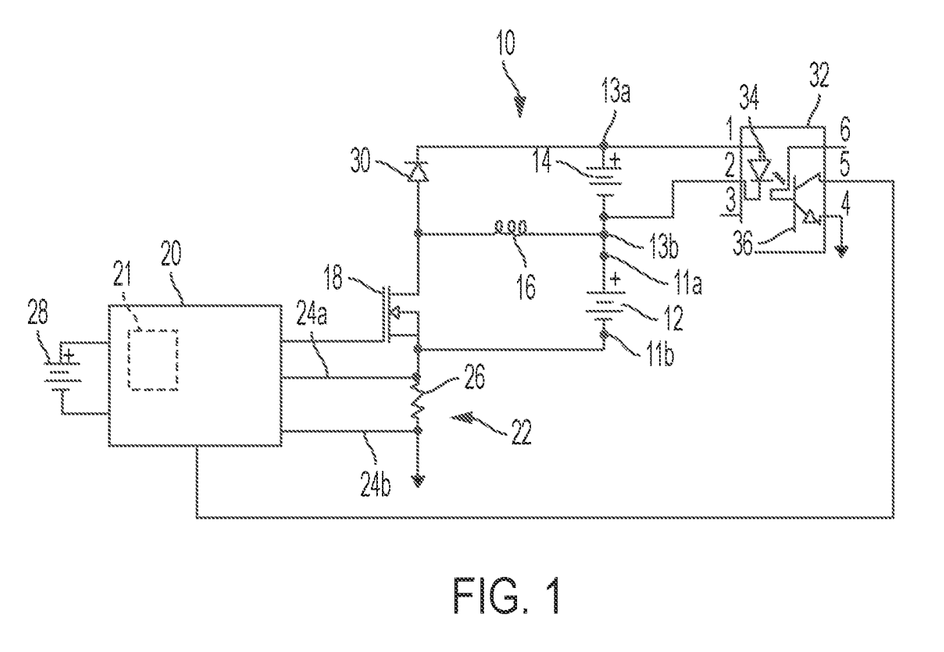
FIG. 1 is a schematic circuit diagram of a battery charger in accordance with an example embodiment of the present invention.
Figure 9:
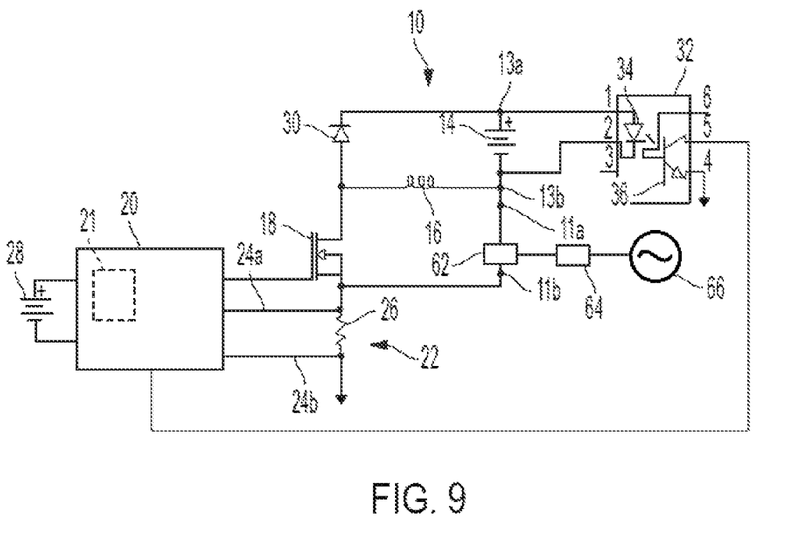
FIG. 9 is a schematic circuit diagram of a battery charger in accordance with another example embodiment of the present invention.

Referring to FIG. 1, there is shown a charger 10 in accordance with an example embodiment. The charger 10 may include a DC power input 12 having first and second terminals 11a, 11b. In some embodiments, the DC power input 12 may include a transformer 64 and rectifier 62 for converting alternating current (AC) received from a mains (e.g., via an electrical outlet or the like) or other external power supply 66 to DC having an appropriate voltage (see e.g., FIG. 9). In other embodiments, the DC power input 12 may constitute electrical contacts for direct connection with an external DC power source, with additional circuitry for conditioning the voltage, if necessary. In still further embodiments, the charger 10 may have an independent DC power source built in as the DC power input 12. Other methods of supplying DC power can be used as well. In a specific example, the DC power input 12 may be a vehicle alternator that is driven by a vehicle motor (not shown). In another example, the charger 10 may include a solar panel (not shown) as part of the DC power input 12. In some embodiments, the charger 10 may alternatively include an AC power source (not shown) with power factor correction.

The charger 10 is intended for use with one or more batteries 14, preferably rechargeable batteries such as lithium-ion (Li-ion), nickel-cadmium (NiCd), nickel-metal hydride (NiMH), alkaline, lead-acid batteries, or the like. At least one battery 14 may be connected to the charger 10 via contacts 13a, 13b. If a plurality of batteries 14 are to be charged, additional contacts (not shown) may be provided, or the batteries 14 may be coupled to one another (e.g., in series) for connection to the single set of contacts 13a, 13b. In addition, the contacts 13a, 13b may be configured according to the specific application of the charger 10. For example, the contacts 13a, 13b may be spring metal contacts for receiving a battery 14 that has been removed from its device (not shown). In another example, when the battery 14 remains inside its device (as in, e.g., a mobile phone) during a charging cycle, the contacts 13a, 13b may be configured as part of a charging cable, such as a USB-C cable, or the like. In yet another example, the battery 14 may remain within its device (e.g., a vehicle) and the charger 10 may be installed within the device (either temporarily or permanently).

An inductor 16 is provided with a first end connected to the DC power input 12. The inductor 16 is preferably of toroidal type, as such a configuration inherently contains radio frequency interference generated by the signal, but other types of air-core or iron-core inductors or the like may be used as well. The inductance of the inductor 16 is preferably fixed and may be selected based on the properties of the battery 14 to be charged. In a number of embodiments, an inductor 16 having an inductance of about 1 μH is sufficient, although inductances at least as high as 250 μH have been shown to be viable for purposes of the inductance. A second end of the inductor 16 is connected to a switch 18 that leads back to the DC power input 12. The switch 18 may be, for example, a metal—oxide—semiconductor field-effect transistor (MOSFET) or other type of transistor having its drain side connected to the second end of the inductor 16 and its source side connected to the DC power input 12. In other embodiments, the switch 18 may be a mechanical or MEMS-type switch or the like. When the switch 18 is active, the DC power input 12 is coupled to the inductor 16 to allow current to flow in the inductor 16. In some embodiments, it may be desired to have an isolated system, in which case a flyback transformer (not shown) would be used in place of the inductor 16.

The switch 18 may be operated by a current mode controller 20. The current mode controller 20 may be a simple comparator circuit or ASIC, or may be a more complex type of controller, processor, or the like, or may be integrated as part of a larger controller, processor, or the like. In the embodiment shown in FIG. 1, the current mode controller 20 controls a voltage on a gate of the MOSFET switch 18. The current mode controller 20 adjusts the gate voltage on the switch 18 based, at least in part, on feedback from a current sensor 22 connected to the source side of the switch 18. The current sensor 22 in FIG. 1 is shown as having two leads 24a, 24b coupled to opposite sides of a resistor 26 disposed between the source side of the switch 18 and ground. Other types of current sensors may be used as well. The sensor leads 24a, 24b are connected to the current mode controller 20, which preferably opens the switch 18 when a predetermined current level is found in the current sensor 22 representative of a particular energy state of the inductor 16, as explained in further detail below. The current mode controller 20 may further include its own auxiliary power source 28. For example, the auxiliary power source 28 may take the form of a voltage regulator, which could draw power from the DC power input 12 or from other sources.

The second end of the inductor 16 may also be coupled to an anode of a diode 30. A cathode of the diode 30 may be, in turn, connected to a positive terminal of the battery 14 to be charged. A negative terminal of the battery 14 is connected back to the first side of the inductor 16. In this way, a conductive path may be formed from the inductor 16 through the diode 30 and into the battery 14. In other embodiments, the diode 30 may be replaced by a separate switch (not shown) that can be used to connect the battery 14 to the inductor 16 when the switch 18 is deactivated. In still other embodiments, the switch 18 may be configured to simultaneously change connections of the inductor 16 to the DC input 12 and the battery 14.

Figure 2A:
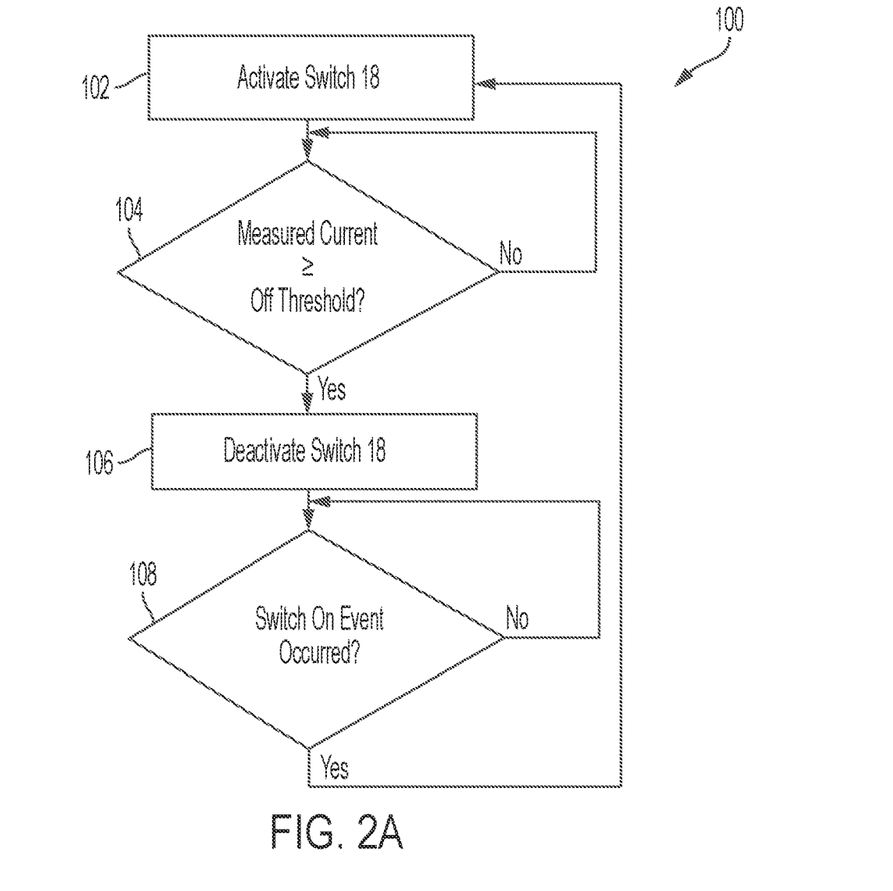
FIG. 2A is a flow chart of an example method of charging using the battery charger of FIG. 1.

Operation of the charger 10 in FIG. 1 can be explained with reference to the simplified flow chart example of FIG. 2A, which preferably is executed by the current mode controller 20. According to the example method 100, initially, the switch 18 will be activated 102 to start the charging process, allowing current to flow from the DC power input 12 into the inductor 16. The diode 30 prevents any current from the DC power input 12 from flowing through the battery 14 to be charged. The current mode controller 20 at step 104 checks whether the current measured at the current sensor 22 exceeds an "off threshold," which generally would be indicative of a desired current level in the inductor 16. The desired current level is preferably predetermined and may be based on the properties of the battery. For example, for a 1 A rated battery, the desired current level may be set to 1 A. However, adjustments could be made to raise or lower the current level based on other factors of the charger 10 or the battery 14. In embodiments allowing adjustments, such adjustments may be made manually and/or automatically, based on sensor feedback to the current mode controller 20 indicating battery 14 properties. In some embodiments, the charger 10 may be dedicated for use with a single battery 14 type. In other embodiments, the charger 10 may be adaptable for use with different types of batteries 14, which allows for manual and/or automatic adjustment to the necessary operation conditions. Note that in other embodiments, rather than or in addition to a current sensor 22, the current mode controller 20 may utilize a timer 21 that is based on an expected time for the inductor 16 to reach the desired current level.

If the sensed current does not exceed the "off threshold,", the current mode controller 20 continues to monitor the sensed current. If the sensed current does exceed the "off threshold," at step 106 the current mode controller 20 deactivates the switch 18. The DC power input 12 is thereby effectively disconnected from the inductor 16, which now transfers its energy to the battery 14 through the diode 30. The inductor 16 should be permitted to completely discharge to the battery 14, i.e., the current from the inductor 16 should go to zero before the cycle repeats. At step 108, the current mode controller 20 determines whether an event to trigger turning on the switch 18 has occurred. In the embodiment shown in FIG. 1, an RC time constant of the current mode controller 20 serves as a timer 21 that the current mode controller 20 uses for turning the switch 18 back on. The RC time constant may be set to a known time for the inductor 16 to discharge to 0 A, although additional delay may also be built in to allow for tolerance or other operational advantages. In other embodiments, an additional current sensor (not shown) may be arranged to determine the current in the inductor 16 and feed back to the current mode controller 20 to allow for turning the switch 18 back on. The method 100 repeats until the battery 14 is charged.

Figure 2B:
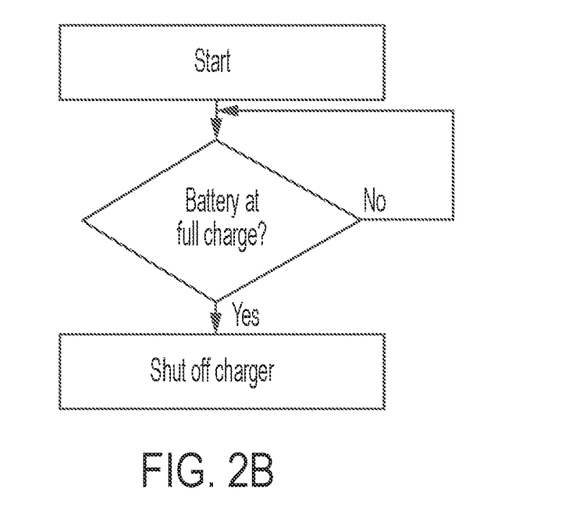
FIG. 2B is a flow chart of an example method for controlling the battery charger of FIG. 1.

In the embodiment shown in FIG. 1, the voltage of the battery 14 is detected by an isolated voltage sensor 32 that feeds back to the current mode controller 20. In operation, the current mode controller 20 can make adjustments as necessary as the battery 14 charges, such as reducing the current level in the inductor 16 as the battery 14 nears full charge, shutting off the charger 10 upon the battery 14 reaching full charge (see FIG. 2B), or the like. In the FIG. 1 embodiment, the voltage sensor 32 is formed of an optocoupler including a light emitter 34 (e.g., a light-emitting diode or the like) connected across the battery 14. The intensity of the light emitted by the light emitter 34 is dependent on the voltage of the battery 14. The light is detected by a photodetector 36 generating a photocurrent indicative of the voltage level of the battery 14 that is fed back to the current mode controller 20. However, other types of voltage sensors 32 may be used as well to determine when the battery 14 is fully charged. In some embodiments, the voltage sensor 32 may be part of the device in which the battery 14 is deployed and may relay voltage level information back to the charger 10 via one or more contacts, data connections, or the like. Charge level may also be made available to the user during charging operations, such as through a mobile phone display (not shown) or the like.

Figure 3:
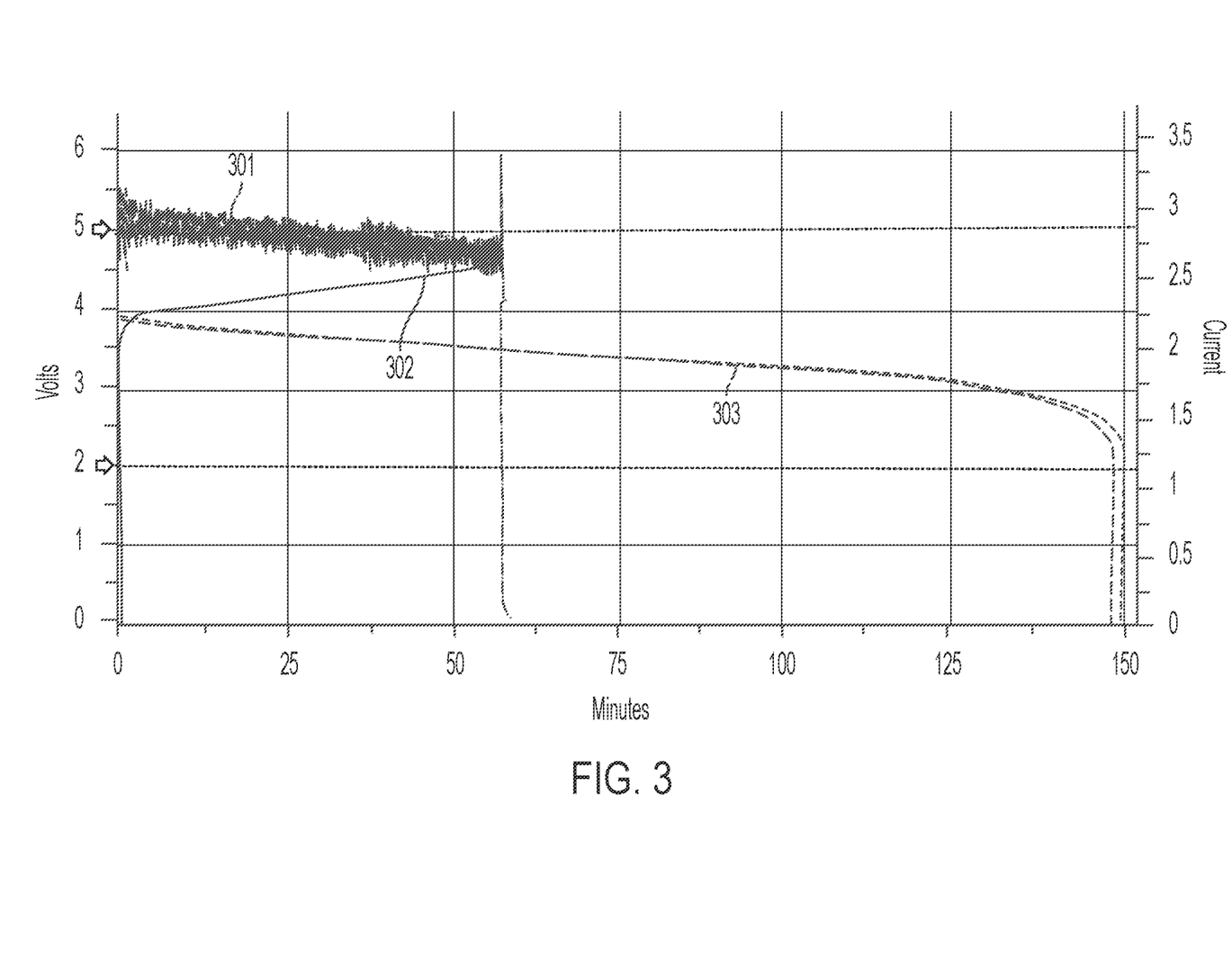
FIG. 3 is a plot of various signals over time representing characteristics of a test battery being fully charged using the battery charger of FIG. 1 and fully discharged.

Comparative testing has been performed on more than a dozen different battery types. Presented herein is exemplary data from testing performed on a Li-ion NCR18650PF battery available from Panasonic. FIG. 3 represents data over two full discharging and charging cycles of the 18650 battery. The charging signal applied to the battery 14 by the charger 10 in both cycles is shown as an oscillating signal 301—representing the repeated connection and disconnection of the inductor 16 to the battery 14. Signal 302 shows the capacity increase of the battery 14 during the charging cycles. Signal 303 represents the battery 14 capacity decline during each of the full discharge cycles, which are shown to take approximately 150 minutes. The data sheet gives a charge characteristic for the battery (CC-CV 0.5C (max), 4.20 V) which shows approximately 150 minutes to reach a full charge from a fully discharged state. In contrast, by using the charger and method described above, as shown by signals 301 and 302 in FIG. 3, the same battery can reach a full charge from a fully discharged state in less than an hour.

Figure 4:
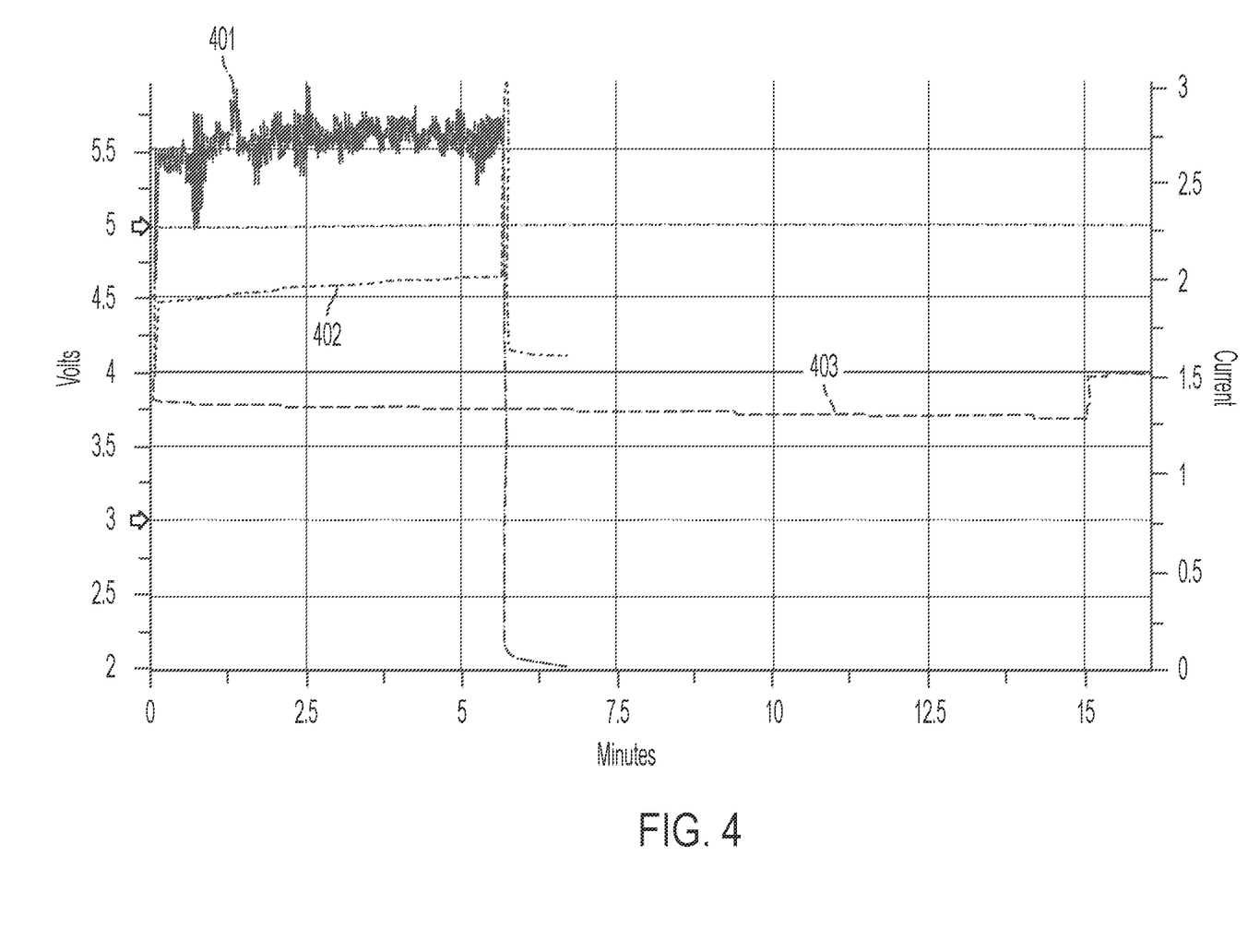
FIG. 4 is a plot of various signals over time representing characteristics of a test battery being partially charged using the battery charger of FIG. 1 and partially discharged.

FIG. 4 similarly represents data over one partial discharging and charging cycle of an 18650 battery. Signal 401 represents the signal applied to the battery 14 during charging, signal 402 represents the battery 14 capacity increase during charging, and signal 403 represents the battery 14 capacity decrease during discharge. For this test, the battery 14 was discharged for a period of fifteen minutes and charged for six minutes.

A benefit realized by the charger and method described above is a significant reduction in heat generated during charging. The presence of heat is known to be a primary factor in battery degradation over time. As damage occurs to the battery, capacity is reduced. For example, the data sheet for the 18650 battery described above shows an almost immediate loss of capacity starting from the first discharging-charging cycle, and steady decrease thereafter as cycle counts grow. Conventional battery charging techniques allow charging within the given battery temperature limits. Charging methodology described herein can minimize much of the heat generated. For example, using room temperature as a baseline, the charging methodology described herein can reduce heat generation as compared to conventional fast charging methodologies by about 75% or more.

Figure 5:
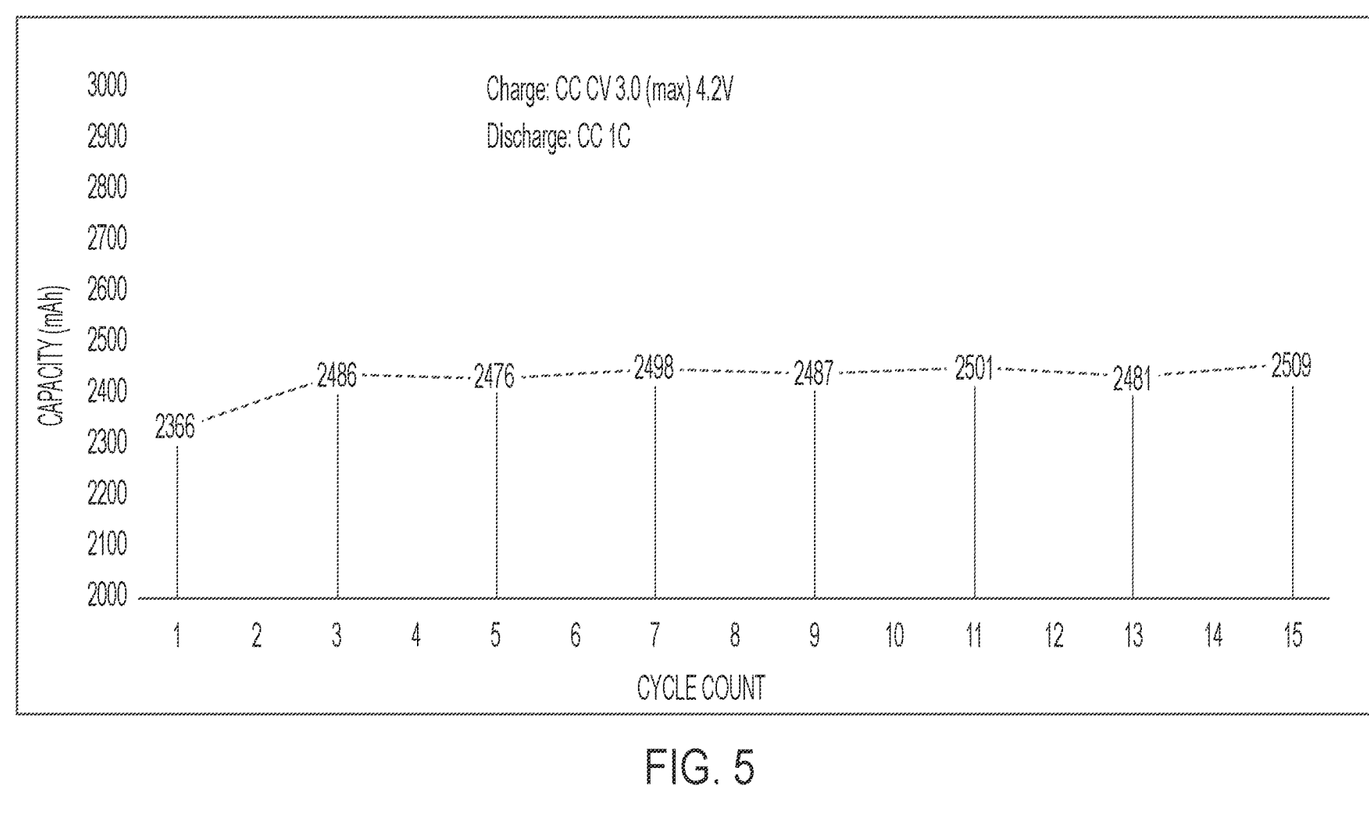
FIG. 5 is a plot of battery capacity over full discharge/charge cycle counts for the battery tested in relation to FIG. 3.

FIG. 5 represents a plot of measured battery capacity (in mAh) over fifteen full discharge-charge cycles of the 18650 battery described in relation to FIG. 3. As can be seen from the data, the battery capacity remains steady at approximately 2500 mAh over the fifteen cycles (with an increase being shown from the first cycle to the third cycle). This can be attributed to at least the fact that very little heat is generated at the battery during charging. With very little heat, there is no degradation in the structure or battery chemistry, and thus no loss of capacity.

Figure 6:
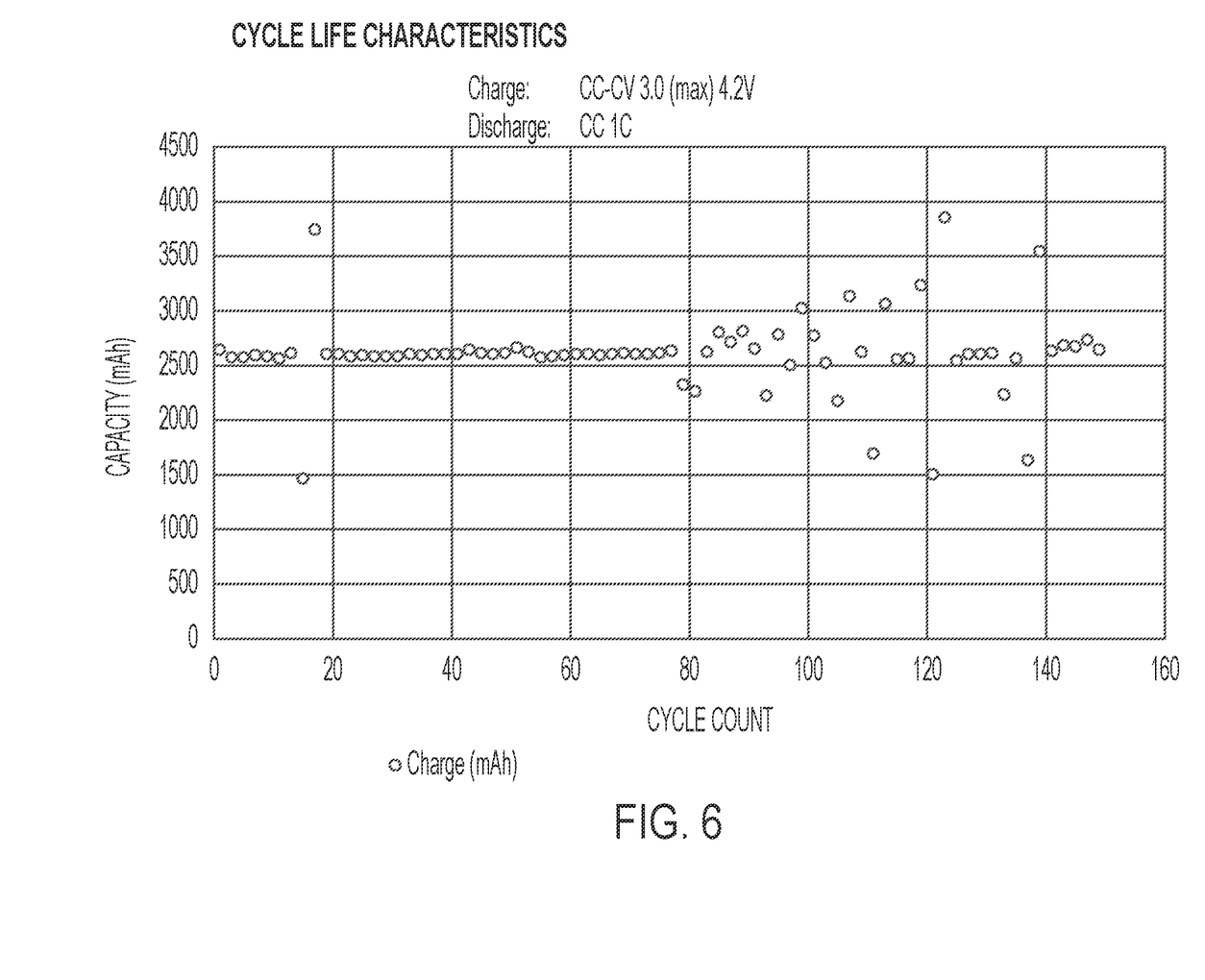
FIG. 6 is a plot of battery capacity over partial discharge/charge cycle counts for the battery tested in relation to FIG. 4.

FIG. 6 represents a similar plot over one hundred and fifty cycles of partial discharging and charging of the 18650 battery described in relation to FIG. 4. As can be seen from the data, the battery capacity remains nearly constant at about 2500 mAh over the full number of cycles, illustrating minimal capacity degradation as compared to the expected drop provided in the battery's data sheet. In fact, in at least one example, an 18650 battery subjected to over 3000 cycle tests still had no visible signs of damage, burning, or mechanical distortion, which significantly contrasts with common experience. Moreover, even if the battery were to be charged up to its temperature limit, using the methodology described above, fast charging would still be accomplished.

Figure 7:
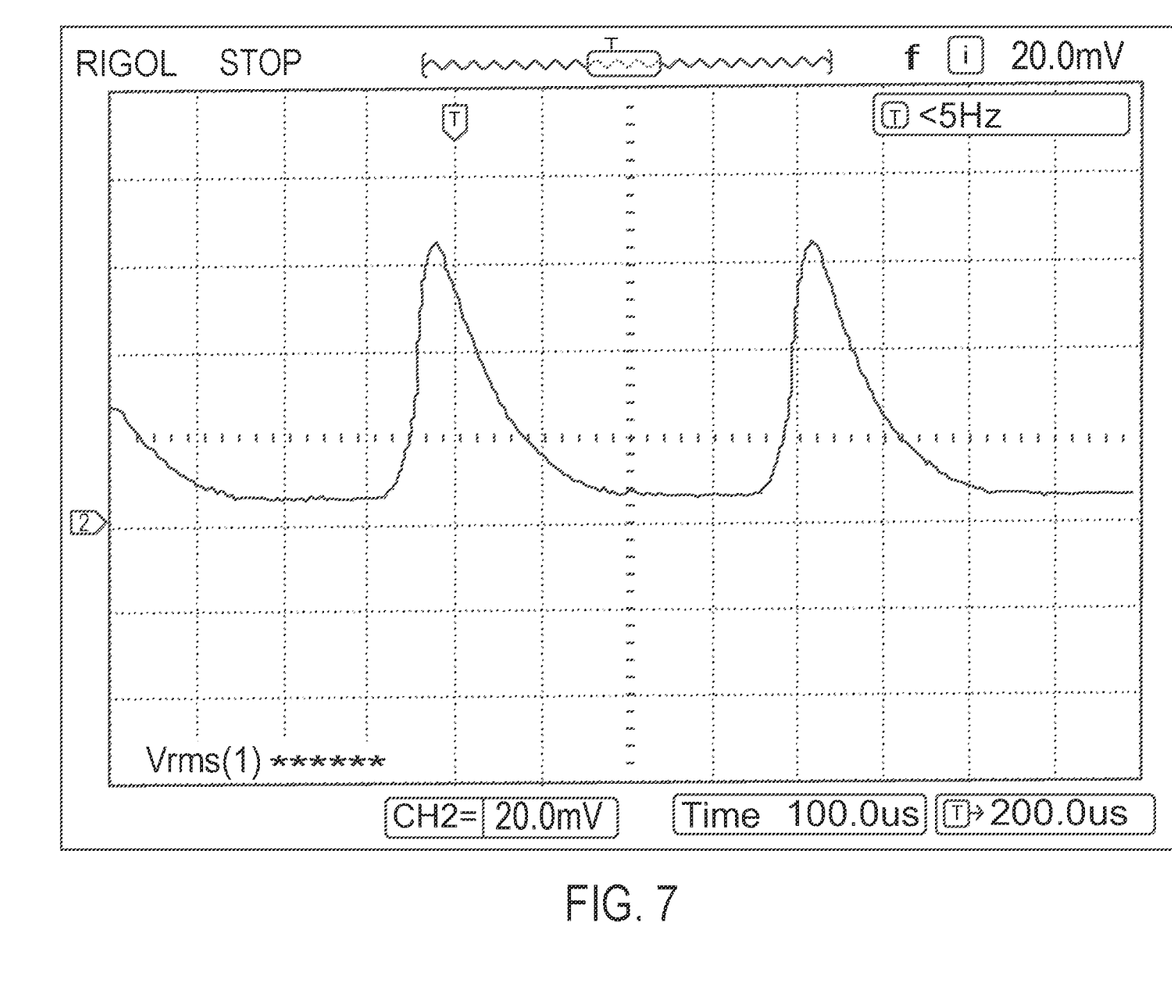
FIG. 7 is an oscilloscope trace of a signal measured between the inductor and the battery of FIG. 1.

Without being bound to any particular theory, it is believed that the substantial decrease in heat generation results from an ideal and efficient waveform applied by the charger to the battery. FIG. 7 shows an oscilloscope trace measured between the inductor 16 and the battery 14 in the example charger 10 of FIG. 1. As can be seen in FIG. 7, the current from the inductor 16 to the battery 14 upon deactivation of the switch 18 will rapidly rise to a maximum before slowly tapering off until reaching zero, resulting in a distinctive modified sawtooth shape. This waveform represents a balance between the fixed inductance of the inductor 16, a peak current value, pulse timing (i.e., when to manipulate the switch 18), the battery 14 voltage, and the voltage of the DC input 12. Application of the law V=Lx(di/dt) allows one to determine the minimum pulse repetition rate, which is a sum of charge time and discharge time of the inductor 16.

Specifically, for the inductor discharge time, V represents the voltage of the battery 14, L is the fixed inductance of the inductor 16, and di represents the peak current setting of the current mode controller 20, which is dependent on the battery 14 properties. Thus, the inductor 16 discharge time $dt_d$ can be determined from dixL/V. The same equation can be used to determine the inductor 16 charge time $dt_c$, with the only difference being that V represents the voltage of the DC input 12 rather than the battery 14. Thus, a minimum pulse repetition rate results from $dt_c+dt_d$. As explained above, in some circumstances, it may be advantageous to introduce a delay where, for example, the current mode controller 20 waits a certain period of time before turning the switch 18 back on even after the inductor 16 has completely discharged. Thus, the pulse repetition rate results from $dt_c+dt_d$+delay. The charging method described above has been tested as being effective for rates of between 1 and 1,000,000 pulses per second and is expected to show improved results at even higher frequencies within the limits set by the minimum pulse rate above. With this methodology, the battery 14 can accept a higher amperage charge than with conventional charging methodology.

The charging methodology described herein further is capable of restoring a battery cell's chemical composition toward its original condition. Without being bound to any particular theory, it is believed that the distinctive waveform and particular application of current in pulses through the intermediary inductor results in atomic reorientation within the battery cell that aligns ions/electrons in a more efficient manner for conducting the charge. This effect combats the effects of sulfation, plating, or the like that tends to degrade a battery's condition over time and allows the battery to behave as if it were in its original condition.

Figure 8:
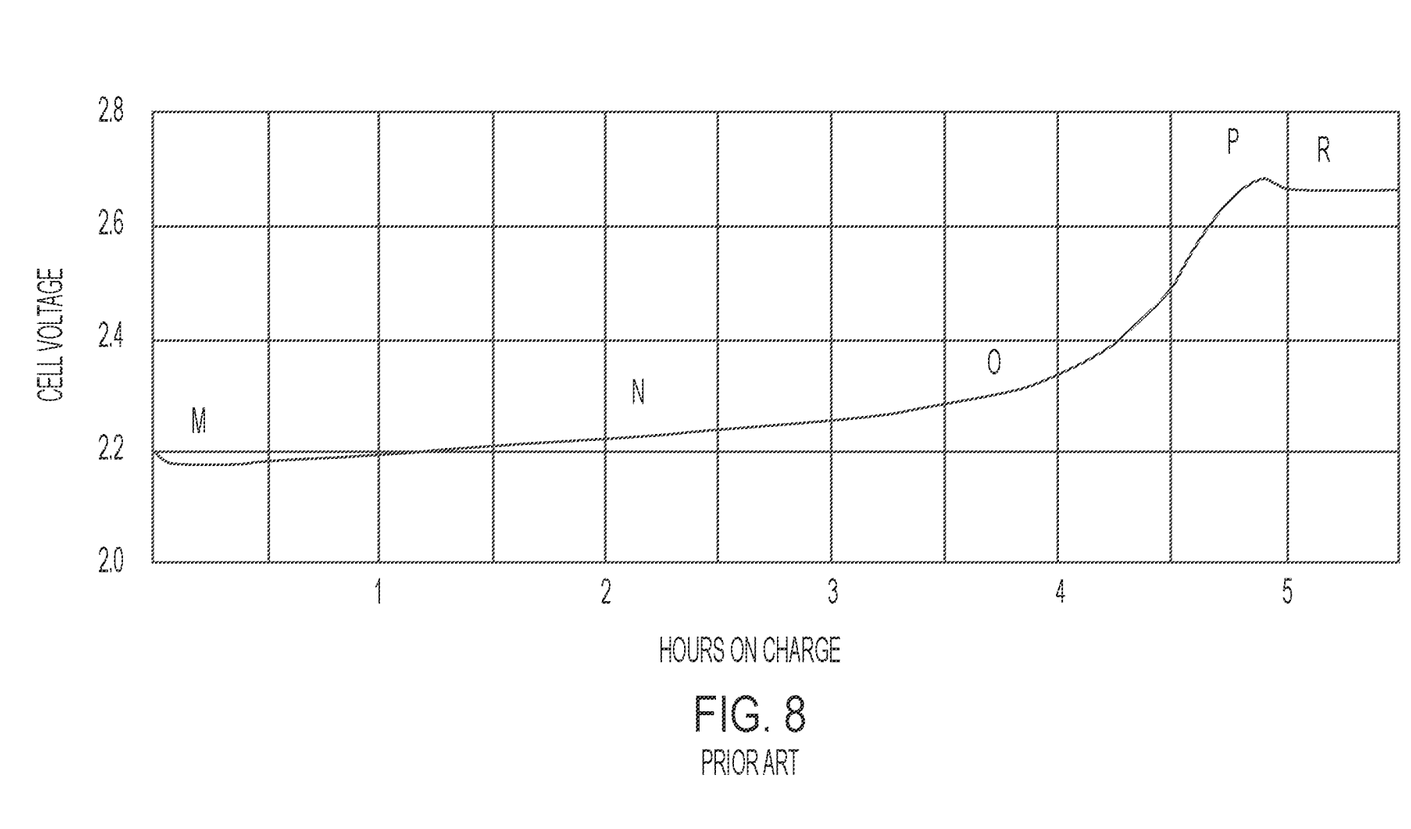
FIG. 8 is an example charge over time plot for a lead acid battery under a conventional charge method.

For some battery chemistries, to achieve this effect, it is preferred to charge the battery 14 to an equilibrium level, i.e., where the battery 14 will not accept any further charge and the voltage becomes constant. For example, FIG. 8, taken from "The Automotive Storage Battery Its Care and Repair" by O. A. Witte (1922), shows a charge over time plot for a lead acid battery for a conventional charging method. At point O during charging, lead sulfate levels begin to decrease rapidly, increasing the charging voltage at a greater rate. At point P, the lead sulfate is completely removed and acid concentration throughout the cell is equalized. No further changes can take place, so that the battery cannot add any additional charge and the voltage plateaus at R. Lead sulfation occurs in these batteries often because the charge is routinely not brought to point P. Using the charging methodology above, point P can be achieved in less time and with less heat, allowing the battery to minimize deleterious effects of sulfation. Thus, for battery types where a saturated charge level allows removal of chemical degradation, the charging methodology described above may be utilized to charge the battery to that level.

Thus, using the charger and method described above it is possible to maintain battery capacity over a significant number of charging/discharging cycles as compared to the early and precipitous declines of batteries charged under conventional methods. Moreover, in some instances, use of the charging methodology described herein has evidently reversed degradations from earlier conventional charging and restored a significant capacity to batteries thought to have reached the end of their useful lives.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A charger for impulsed charging of a battery, the charger comprising:
   first and second charging contacts each configured to receive a respective terminal of the battery to be charged;
   a direct current (DC) power input having a first terminal and a second terminal;
   an inductor having a first end and a second end, the first end being selectively conductively connectable to the first terminal of the DC power input and to the second charging contact, the second end being selectively conductively connectable to the first charging contact and to the second terminal of the DC power input;
   a current limiting element located between the second end of the inductor and the first charging contact such that current can never flow from the first charging contact toward the second end of the inductor;
   a switch located between the second end of the inductor and the second terminal of the DC power input;
   a current sensor configured to measure current flowing between the DC power input and the inductor; and
   a controller configured to charge the battery by alternating between:
   placing the switch in a first configuration, which connects the inductor across the DC power input to enable the DC power input to magnetically energize the inductor, and
   placing, in response to a signal from the current sensor indicating that the current between the DC power input and the inductor exceeds a predetermined threshold value, the switch in a second configuration, which disconnects the inductor from the DC power input and connects the inductor across the first and second charging contacts to enable magnetic energy stored in the inductor to discharge to the battery connected across the first and second charging contacts.

2. The charger of claim 1, wherein the controller includes a timer, and the controller is further configured to place the switch in the first configuration upon expiration of the timer.

3. The charger of claim 1, further comprising a voltage sensor connected across the first and second charging contacts and configured to measure a voltage of the battery connected across the first and second charging contacts, wherein the controller is configured to shut off the charger when the measured voltage exceeds a predetermined value.

4. The charger of claim 1, wherein the current limiting element is a diode having an anode and a cathode, the cathode being connected to the first charging contact and the anode being connected to the second end of the inductor.

5. The charger of claim 1, wherein the inductor is a toroidal type inductor.

6. The charger of claim 1, wherein when the controller places the switch in the second configuration, a current between the inductor and the battery connected across the first and second charging contacts rises from 0 Amperes to a maximum value at a first average rate and declines from the maximum value to 0 Amperes at a second average rate that is lower than the first average rate.

7. The charger of claim 1, wherein the current sensor includes a resistor, a first lead connected between a first end of the resistor and a side of the switch connected to the second terminal, and a second lead connected to a second end of the resistor opposite the first end.

* * * * *